US012718292B2

(12) United States Patent
Rose et al.

(10) Patent No.: US 12,718,292 B2
(45) Date of Patent: Aug. 25, 2026

(54) AUTOMATED WEBPAGE CONFIRMATION AND ON-LINE AUTHENTICATION PROCESSES

(71) Applicant: Truist Bank, Charlotte, NC (US)

(72) Inventors: Teresa Rose, Holly Springs, NC (US); Lori Hall, Raleigh, NC (US); Douglas Joel Zickafoose, Raleigh, NC (US)

(73) Assignee: Truist Bank, Charlotte, NC (US)

( * ) Notice: Subject to any disclaimer, the term of this patent is extended or adjusted under 35 U.S.C. 154(b) by 888 days.

(21) Appl. No.: 17/888,028

(22) Filed: Aug. 15, 2022

(65) Prior Publication Data

US 2023/0014116 A1 Jan. 19, 2023

Related U.S. Application Data

(63) Continuation-in-part of application No. 16/906,983, filed on Jun. 19, 2020, now abandoned, which is a continuation of application No. 15/153,561, filed on May 12, 2016, now abandoned, which is a continuation of application No. 14/099,517, filed on Dec. 6, 2013, now abandoned, which is a continuation of application No. 12/540,188, filed on Aug. 12, 2009, now Pat. No. 8,612,339.

(60) Provisional application No. 61/088,239, filed on Aug. 12, 2008, provisional application No. 61/088,229, filed on Aug. 12, 2008, provisional application No. 61/088,267, filed on Aug. 12, 2008.

(51) Int. Cl.

| | |
|---|---|
| ***G06Q 40/03*** | (2023.01) |
| ***G06Q 30/0601*** | (2023.01) |
| ***G06Q 40/02*** | (2023.01) |

(52) U.S. Cl.
CPC ......... *G06Q 40/03* (2023.01); *G06Q 30/0609* (2013.01); *G06Q 30/0641* (2013.01); *G06Q 40/02* (2013.01)

(58) Field of Classification Search
USPC ........................................................... 705/35
See application file for complete search history.

(56) References Cited

U.S. PATENT DOCUMENTS 5,101,479 A * 3/1992 Baker ................. G06F 13/4068 710/105
5,119,292 A * 6/1992 Baker ................... G06F 13/374 710/113

(Continued)

OTHER PUBLICATIONS

Markus Jakobsson, "Solutions to the Problem," in The Death of the Internet , IEEE, 2012, pp. 245-329 (Solutions) (Year: 2012).*

*Primary Examiner* — Chikaodinaka Ojiaku
(74) *Attorney, Agent, or Firm* — Kilpatrick Townsend & Stockton LLP; Michael A. Springs, Esq.

(57) ABSTRACT

In some examples, a system can collect data from a user device and configure a webpage based on the data. For example, the system can receive a request for a webpage from the user device of a user. The system can receive data indicating at least one webpage previously visited by the user. The system can determine content of the at least one webpage. The system can configure a user interface of the webpage based on the content of the at least one webpage, to thereby generate a configured user interface. The system can provide the webpage with the configured user interface to the user device for display to the user.

20 Claims, 15 Drawing Sheets

(56) References Cited

U.S. PATENT DOCUMENTS 5,148,545 A * 9/1992 Herbst .................. G06F 13/368 710/240
5,819,291 A * 10/1998 Haimowitz ......... G06F 16/9014 707/999.005
5,913,025 A * 6/1999 Higley .................... G06F 21/31 707/999.009
5,960,430 A * 9/1999 Haimowitz ......... G06F 16/9014 707/999.005
6,134,662 A * 10/2000 Levy ..................... G06F 21/606 713/160
6,188,766 B1 * 2/2001 Kocher .............. H04N 1/32101 358/448
6,212,633 B1 * 4/2001 Levy ................... H04L 63/0218 713/153
6,240,513 B1 * 5/2001 Friedman ............ H04L 63/0823 713/160
6,330,327 B1 * 12/2001 Lee ..................... H04M 3/5183 379/266.1
6,798,780 B1 * 9/2004 Dan .................... H04L 12/2854 370/216
6,813,368 B1 * 11/2004 Khanna ............. H04N 1/32229 713/176
6,856,963 B1 * 2/2005 Hurwitz ............ G06Q 30/0201 705/7.29
7,188,003 B2 * 3/2007 Ransom .................. H04L 63/20 700/286
7,200,578 B2 * 4/2007 Paltenghe .......... G06Q 20/3574 705/26.1
7,310,322 B2 * 12/2007 Graf .................... H04W 88/181 370/465
7,376,431 B2 * 5/2008 Niedermeyer ........... G07C 9/22 379/189
7,509,289 B2 * 3/2009 Barron ................... G06Q 20/40 705/41
7,637,422 B2 * 12/2009 Kwak ..................... G07F 19/20 235/379
7,640,193 B2 * 12/2009 Crespo .............. G06Q 30/0633 705/26.8
7,793,829 B2 * 9/2010 Randazza ............. G06Q 20/40 235/375
7,831,246 B1 * 11/2010 Smith ................ G06Q 20/3255 455/420
7,865,399 B2 * 1/2011 Crespo ................... G06Q 20/02 705/37
7,873,573 B2 * 1/2011 Realini .................. G06Q 40/00 705/37
7,877,297 B2 * 1/2011 Gould .................... G06Q 20/40 705/26.1
7,890,433 B2 * 2/2011 Singhal .................. G06Q 20/14 705/64
7,912,751 B1 * 3/2011 Allos ................. G06Q 30/0214 705/14.1
8,019,691 B2 * 9/2011 Dominguez ............ G06F 21/33 705/78
8,136,148 B1 * 3/2012 Chayanam ............. G06F 21/34 715/780
8,161,182 B1 * 4/2012 Cheng ..................... H04L 47/10 709/239
8,332,272 B2 * 12/2012 Fisher ................ G06Q 20/3226 455/406
8,649,733 B2 * 2/2014 Qi ....................... H04W 12/068 379/202.01
8,908,539 B1 * 12/2014 Pani ........................ H04L 43/20 370/248
10,063,313 B1 * 8/2018 Al Sayeed ............ H04J 14/029
10,373,222 B1 * 8/2019 Sahni ................. G06Q 30/0609
11,164,105 B2 * 11/2021 Sankaran ............... G06N 3/045
11,238,530 B1 * 2/2022 Kurani ................... G06Q 40/03
2001/0011250 A1 * 8/2001 Paltenghe ................. G07F 7/08 705/41
2002/0042885 A1 * 4/2002 Eskandarian ........... G06F 21/32 726/6
2002/0062249 A1 * 5/2002 Iannacci ................ G06Q 30/06 705/14.1
2002/0097817 A1 * 7/2002 Beerel ................... H03M 13/39 375/341
2002/0138445 A1 * 9/2002 Laage ................. G06Q 20/382 705/67
2002/0161955 A1 * 10/2002 Beukema .................. G06F 9/52 710/200
2003/0061170 A1 * 3/2003 Uzo ....................... G06Q 20/29 705/37
2003/0097330 A1 * 5/2003 Hillmer .................. G06Q 40/03 705/38
2003/0182421 A1 * 9/2003 Faybishenko ....... H04L 67/1042 709/224
2003/0200184 A1 * 10/2003 Dominguez ......... G06Q 20/425 705/78
2003/0208684 A1 * 11/2003 Camacho ............ G06Q 20/401 713/185
2003/0212642 A1 * 11/2003 Weller ................ G06Q 20/367 705/67
2003/0233648 A1 * 12/2003 Earl .......................... G06F 8/65 717/176
2004/0039663 A1 * 2/2004 Kernz .................... G06Q 30/08 705/26.5
2004/0093521 A1 * 5/2004 Hamadeh .............. H04L 69/161 726/22
2004/0117302 A1 * 6/2004 Weichert ........... G06Q 20/1085 705/40
2004/0143546 A1 * 7/2004 Wood ..................... G06Q 30/04 705/40
2004/0222283 A1 * 11/2004 Mastie .............. G06Q 20/1085 235/379
2005/0108104 A1 * 5/2005 Woo ....................... G06Q 20/12 705/26.8
2005/0149544 A1 * 7/2005 Bishop ................... G06Q 20/04
2005/0163319 A1 * 7/2005 Hancock ................. H04L 63/08 380/270
2005/0182774 A1 * 8/2005 Weir .................... G06Q 20/023
2005/0220042 A1 * 10/2005 Chang ................... H04L 1/1671 370/278
2005/0246278 A1 * 11/2005 Gerber ................... G06Q 20/40 705/44
2005/0268263 A1 * 12/2005 Sun ..................... G06F 30/3312 716/114
2005/0278192 A1 * 12/2005 Cantini ................ G06Q 20/363 705/1.1
2006/0034171 A1 * 2/2006 Rajsic ................... H04L 49/256 370/252
2006/0036500 A1 * 2/2006 Ota ....................... G07F 7/1008 705/16
2006/0135233 A1 * 6/2006 Willis ..................... A63F 13/12 463/1
2006/0174323 A1 * 8/2006 Brown ................ H04L 63/0428 726/3
2006/0195362 A1 * 8/2006 Jacobi ................ G06Q 30/0631 705/14.73
2006/0199631 A1 * 9/2006 McGill ................... G07F 17/32 463/16
2006/0242026 A1 * 10/2006 Crespo ................... G06Q 40/04 705/26.8
2007/0011104 A1 * 1/2007 Leger ................... G06Q 20/085 705/77
2007/0164097 A1 * 7/2007 Kwak ................... G07F 19/202 235/379
2007/0181667 A1 * 8/2007 Kwak .................... B65H 31/22 235/379
2007/0226047 A1 * 9/2007 Ward ..................... G06Q 30/02 705/7.32
2008/0059962 A1 * 3/2008 Ito ...................... H04N 1/00912 718/100
2008/0082452 A1 * 4/2008 Wankmueller ... G06Q 20/40145 705/72
2008/0120218 A1 * 5/2008 Reid ...................... G06Q 40/03 705/37
2008/0164308 A1 * 7/2008 Aaron ................ G06Q 20/3224 235/380

(56) References Cited

U.S. PATENT DOCUMENTS

2008/0167980 A1* 7/2008 Aaron ................ G06Q 20/3224 705/35
2008/0203153 A1* 8/2008 Keithley ................ G06Q 20/24 235/380
2008/0208759 A1* 8/2008 Royyuru ............ G06Q 20/4012 705/72
2008/0243637 A1* 10/2008 Chan ...................... G06Q 30/02 705/26.1
2008/0244739 A1* 10/2008 Liu ..................... H04L 63/1466 726/22
2008/0282357 A1* 11/2008 Sharpe .................... G06F 21/10 726/26
2009/0106134 A1* 4/2009 Royyuru ................ G06Q 40/00 705/35
2009/0106154 A1* 4/2009 Reynolds ............. G06Q 10/109 705/45
2009/0106826 A1* 4/2009 Palestrant ............... H04L 63/08 726/7
2009/0119190 A1* 5/2009 Realini .............. G06Q 20/3265 705/37
2009/0144194 A1* 6/2009 Dickelman .......... G06Q 20/202 705/35
2009/0293108 A1* 11/2009 Weeden .................. G06F 21/41 726/6
2009/0313134 A1* 12/2009 Faith .................. G06Q 30/0601 705/26.1
2010/0017328 A1* 1/2010 Stephen ............. G06Q 20/4037 705/42
2010/0042997 A1* 2/2010 Lev ........................... G06F 9/52 718/100
2010/0280859 A1* 11/2010 Frederick, II .......... G06Q 40/00 382/137
2010/0280882 A1* 11/2010 Faith ................ G06Q 10/06375 705/7.37
2010/0318463 A1* 12/2010 Reany .................... G06Q 20/04 705/44
2010/0332399 A1* 12/2010 Benson .............. G06Q 20/4014 705/44
2011/0078059 A1* 3/2011 Chambers .............. G06Q 40/12 705/30
2011/0157306 A1* 6/2011 Lin ....................... G06T 19/006 348/E13.001
2012/0116678 A1* 5/2012 Witmer .................. G09B 29/00 702/5
2012/0151567 A1* 6/2012 Chayanam .............. G06F 21/31 726/7
2012/0233139 A1* 9/2012 Larson ................ G06F 16/2471 707/703
2012/0290950 A1* 11/2012 Rapaport ............ H04L 12/1818 715/753
2013/0282580 A1* 10/2013 O'Brien ................. G06Q 20/24 705/44
2014/0012760 A1* 1/2014 Keresman, III ....... G06Q 20/40 705/44
2014/0081927 A1* 3/2014 Lipcon .................. G06F 16/215 707/692
2014/0201094 A1* 7/2014 Herrington ............ G06V 20/80 705/317
2014/0278038 A1* 9/2014 Stankoulov ........... G06T 11/203 701/123
2015/0006758 A1* 1/2015 Holtman ............... H04L 67/563 709/244
2015/0039470 A1* 2/2015 Crites ................ G06Q 20/3821 705/26.61
2015/0269383 A1* 9/2015 Lang ....................... G06F 21/57 726/1
2016/0112220 A1* 4/2016 Paker ................ H04L 25/03242 375/232
2016/0153796 A1* 6/2016 Stankoulov ........ G01C 21/3469 701/123
2016/0321751 A1* 11/2016 Creighton, IV ....... G06Q 40/04
2017/0161829 A1* 6/2017 Mazier ................... G06Q 40/06
2017/0221133 A1* 8/2017 Traina ................ G06Q 30/0635
2017/0236219 A1* 8/2017 Haber .................... G06Q 40/12 705/30
2018/0232736 A1* 8/2018 Keresman, III .......... G07F 7/08
2018/0351811 A1* 12/2018 Taheri ..................... H04L 47/11
2018/0351967 A1* 12/2018 Jacobson .............. H04L 9/0891
2019/0019182 A1* 1/2019 Vityaz ................. G06F 16/2379
2021/0248534 A1* 8/2021 Ares ....................... G06F 16/26
2021/0295405 A1* 9/2021 Vedaste .............. G06Q 30/0635
2021/0390609 A1* 12/2021 Trinh .................. G06F 16/9535
2022/0351264 A1* 11/2022 Yang .................. G06Q 30/0609
2025/0259160 A1* 8/2025 Young ................ G06Q 20/3274

* cited by examiner

200

FIRST SET OF INFORMATION

ONLINE EXISTING USER ID FOR USER

ONLINE EXISTING USER PASSWORD FOR USER

- IF USER IS PREDETERMINED ENTITY:
  - OWNER LAST NAME
  - PART OF ID NUMBER ASSOCIATED WITH OWNER
- IF OWNER IS NOT PREDETERMINED ENTITY
  - BUSINESS NAME
  - PART OF ID NUMBER ASSOCIATED WITH USER

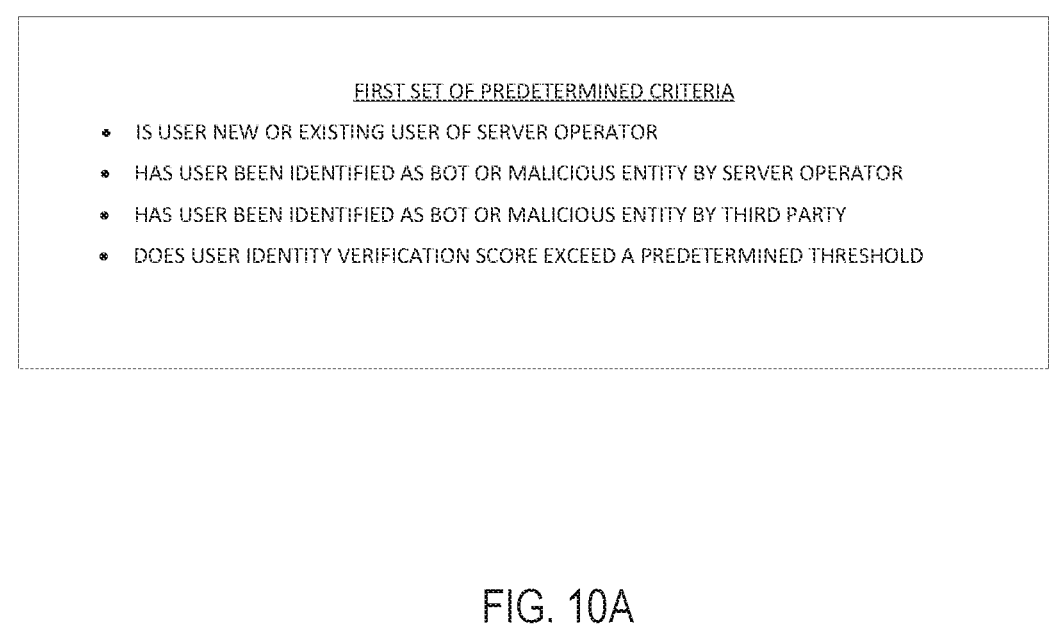

FIRST SET OF PREDETERMINED CRITERIA

- IS USER NEW OR EXISTING USER OF SERVER OPERATOR
- HAS USER BEEN IDENTIFIED AS BOT OR MALICIOUS ENTITY BY SERVER OPERATOR
- HAS USER BEEN IDENTIFIED AS BOT OR MALICIOUS ENTITY BY THIRD PARTY
- DOES USER IDENTITY VERIFICATION SCORE EXCEED A PREDETERMINED THRESHOLD

FIG. 10A

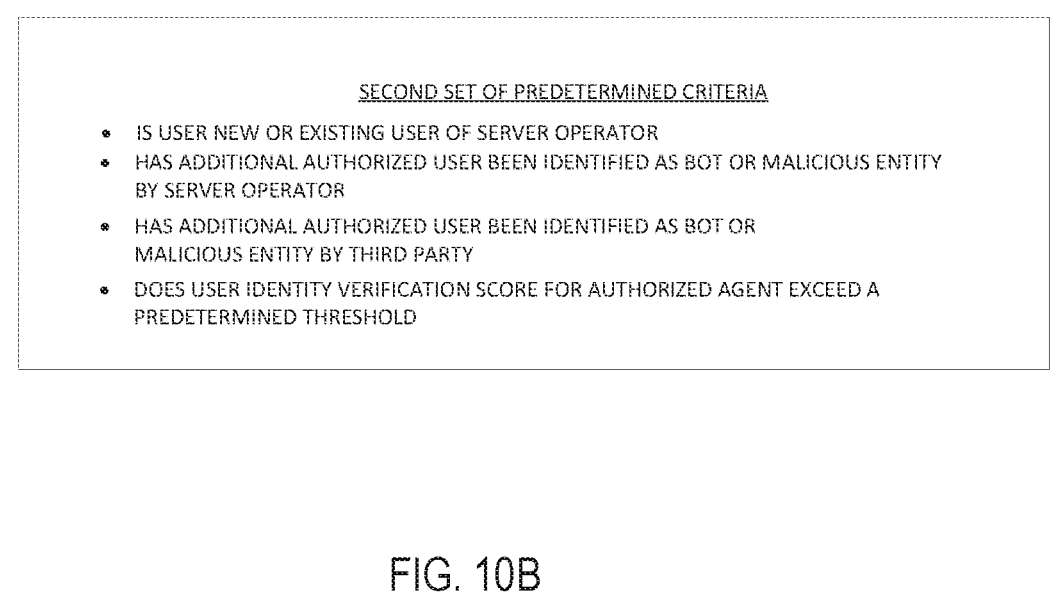

SECOND SET OF PREDETERMINED CRITERIA

- IS USER NEW OR EXISTING USER OF SERVER OPERATOR
- HAS ADDITIONAL AUTHORIZED USER BEEN IDENTIFIED AS BOT OR MALICIOUS ENTITY BY SERVER OPERATOR
- HAS ADDITIONAL AUTHORIZED USER BEEN IDENTIFIED AS BOT OR MALICIOUS ENTITY BY THIRD PARTY
- DOES USER IDENTITY VERIFICATION SCORE FOR AUTHORIZED AGENT EXCEED A PREDETERMINED THRESHOLD

FIG. 10B

Figure 11A:
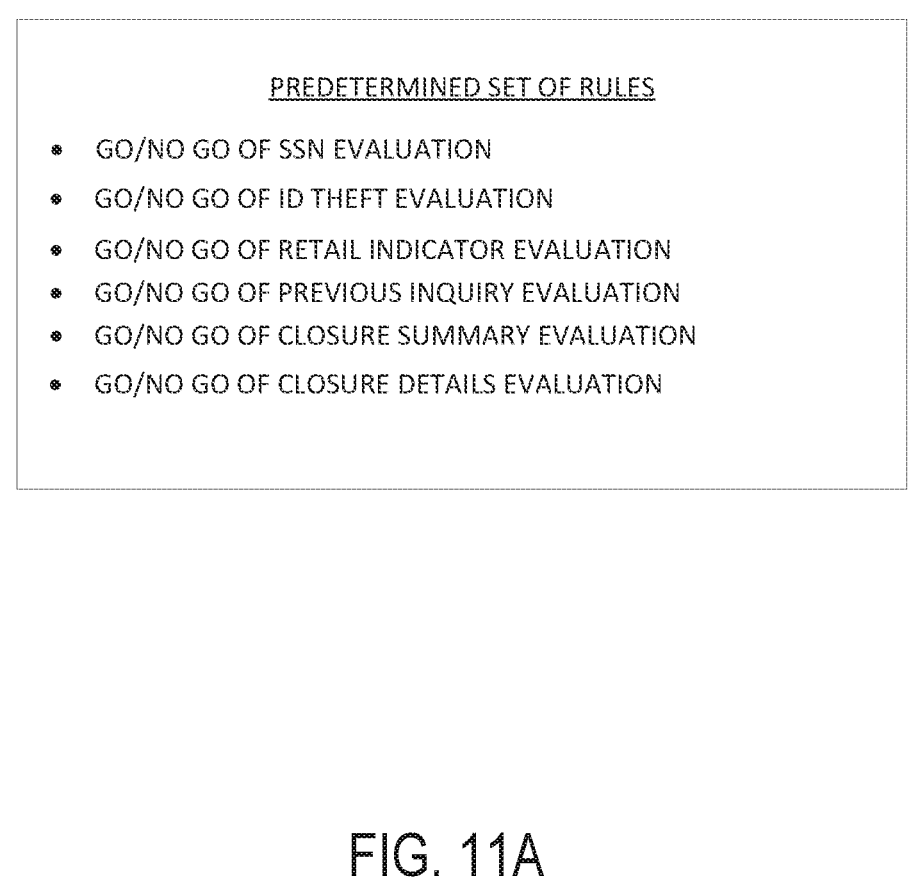

PREDETERMINED SET OF RULES

- GO/NO GO OF SSN EVALUATION
- GO/NO GO OF ID THEFT EVALUATION
- GO/NO GO OF RETAIL INDICATOR EVALUATION
- GO/NO GO OF PREVIOUS INQUIRY EVALUATION
- GO/NO GO OF CLOSURE SUMMARY EVALUATION
- GO/NO GO OF CLOSURE DETAILS EVALUATION

AUTOMATED WEBPAGE CONFIRMATION AND ON-LINE AUTHENTICATION PROCESSES

RELATED AND CO-PENDING APPLICATIONS

This application is a continuation-in-part of and claims priority to U.S. application Ser. No. 16/906,983, filed 19 Jun. 2020, which itself is a continuation of and claims priority benefit of U.S. application Ser. No. 15/153,561, filed 12 May 2016, which itself is a continuation of and claims priority benefit of U.S. application Ser. No. 14/099,517, filed on 6 Dec. 2013, which itself is a continuation of and claims priority benefit of U.S. application Ser. No. 12/540,188, filed on 12 Aug. 2009, now U.S. Pat. No. 8,612,339, which itself claims priority benefit of U.S. Provisional application Ser. No. 61/088,267 filed 12 Aug. 2008; Ser. No. 61/088,229 filed 12 Aug. 2008; and Ser. No. 61/088,239 filed 12 Aug. 2008, the entirety of each is hereby incorporated herein by reference.

TECHNICAL FIELD

The present disclosure relates generally to webpage configuration and on-line authentication. More particularly (although not necessarily exclusively), some examples described herein relate to automatically configuring a webpage's arrangement of graphical elements based on client-device data, and on-line authentication processes configured to prevent against automated bot attacks and malicious actors.

BACKGROUND

The public is increasingly accessing webpages and other on-line portals to perform various activities on-line. Performing such activities on-line provides convenience, safety, and potentially new types of services not readily or conveniently available in-person. Such potentially new services include access to superior up-to-the minute information, information filters, and search agents. With the increase in the number of activities performed on-line, new and more powerful methods are being developed for protecting the security of the user. The result is that convenience and enhanced security have combined to make on-line services more useful and effective, thereby driving the development of newer and more integrated services. More sophisticated server operators can provide greater integration and a high degree of user control, which can enable on-line users to synthesize, monitor, and analyze a wide array of activities and personal data.

SUMMARY

A webpage can be configured for a user based on data collected from a user device. For example, a system described herein can include a processor and a memory that includes instructions executable by the processor device to perform operations. The operations can include receiving a request for a webpage from the user device of the user. The operations can also include receiving data indicating at least one webpage previously visited by the user. The operations can further include determining content of the at least one webpage. The operations can include configuring a user interface of the webpage based on the content of the at least one webpage, to thereby generate a configured user interface. Additionally, the operations can include providing the webpage with the configured user interface to the user device for display to the user.

In another examples, a method described herein can include receiving a request for a webpage from the user device of the user. The method can also include receiving data indicating at least one webpage previously visited by the user. The method can further include determining content of the at least one webpage. The method can include configuring a user interface of the webpage based on the content of the at least one webpage, to thereby generate a configured user interface. Additionally, the method can include providing the webpage with the configured user interface to the user device for display to the user.

In an example, a non-transitory computer-readable medium includes instructions that are executable by a processor for causing the processor to perform operations including receiving a request for a webpage from the user device of the user. The operations can also include receiving data indicating at least one webpage previously visited by the user. The operations can further include determining content of the at least one webpage. The operations can include configuring a user interface of the webpage based on the content of the at least one webpage, to thereby generate a configured user interface. Additionally, the operations can include providing the webpage with the configured user interface to the user device for display to the user.

BRIEF DESCRIPTION OF THE DRAWINGS

FIG. 10A is a representative chart listing criteria that makes up a first set of predetermined criteria according to an embodiment of the disclosed subject matter.

FIG. 10B is a representative chart listing criteria that makes up a second set of predetermined criteria according to an embodiment of the disclosed subject matter.

FIG. 11A is a representative chart listing rules that makes up a predetermined set of rules according to an embodiment of the disclosed subject matter.

FIG. 11B is a representative chart listing risk evaluation rules that make up a predetermined set of risk evaluation rules according to an embodiment of the disclosed subject matter.

DETAILED DESCRIPTION

Figure 1:
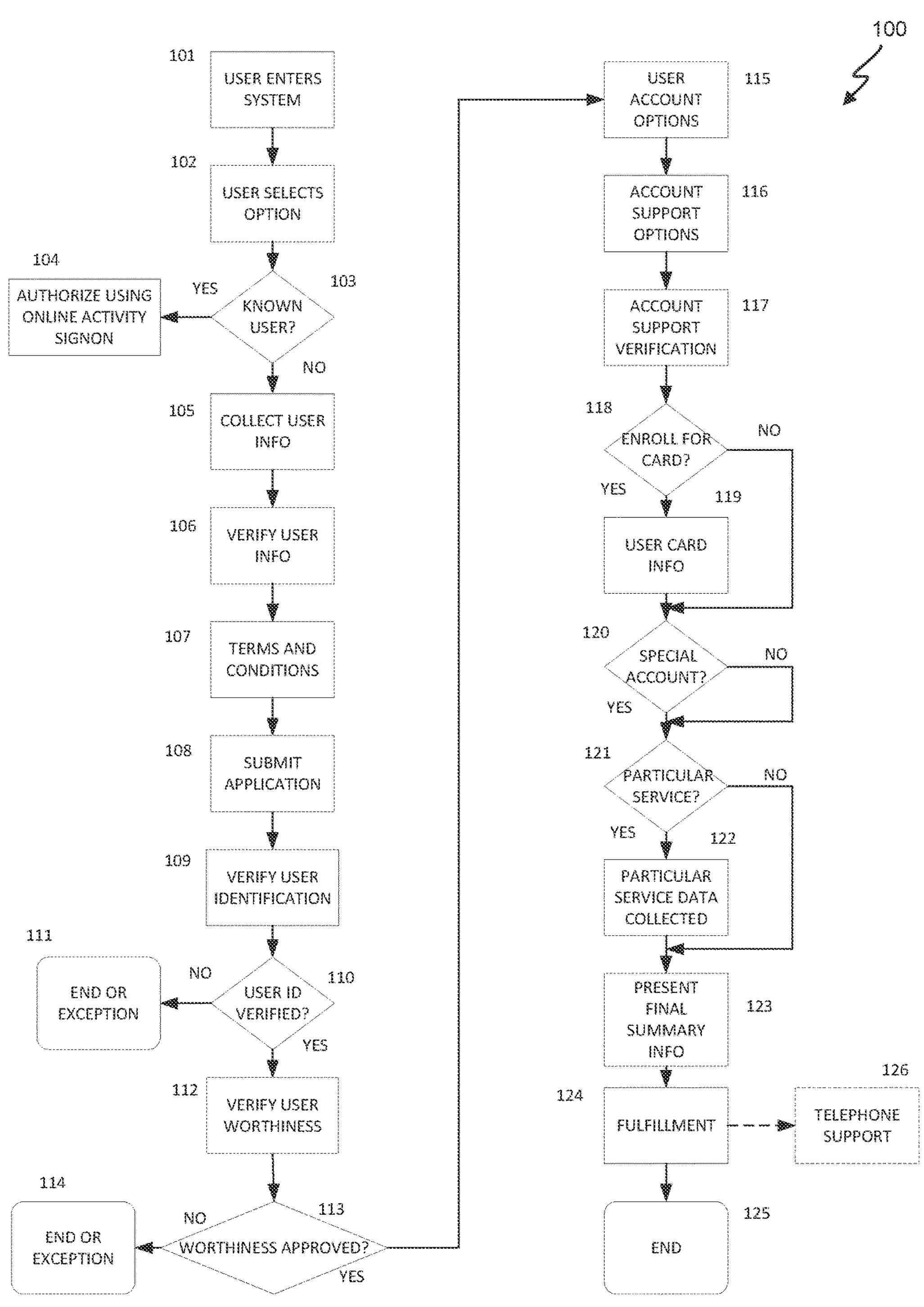
FIG. 1 is a flow chart of an embodiment of the disclosed subject matter.

Certain aspects and features of the present disclosure relate to automatically customizing a layout of a user interface (e.g., a webpage or other graphical user interface) based on collected data describing characteristics of a user device or the user. In some examples, the customization can be performed using a machine-learning model, which can intelligently select, position, and highlight graphical elements within the user interface based on the collected data. Examples of the graphical elements can include images, internet links, and text. In some examples, the graphical elements can correspond to and describe various physical devices, such as physical cards that provide the user access to services provided by a server operator. The graphical elements can be selected, spatially positioned, highlighted, or manipulated within the user interface based on the collected data.

In some examples, the collected data can include device information associated with the user device. Examples of such device information can include a device type, a path taken to reach the webpage, a browser type, a browser history, a screen size associated with the device, the frequency of visits to certain webpages, or any combination of these. The browser history may indicate one or more webpages previously visited by the user prior to accessing the user interface. The collected data can also include user interaction information indicating one or more graphical elements selected by the user in the user interface. For example, the system can track user interactions with the graphical elements and tailor the layout of the user interface based on the user interactions.

In some examples, a machine-learning model (e.g., a neural network, classifier, or support vector machine) can select certain graphical elements for inclusion in the user interface based on the collected data or otherwise determine how to configure the user interface based on the collected data. For example, the machine-learning model can analyze the browser history of the user device to determine that the user frequently accesses websites related to retirement, and that the user frequently selects retirement-related graphical elements on the websites. So, the machine-learning model can select retirement-related graphical elements for inclusion in the user interface or arrange the graphical elements in the user interface so that retirement-related graphical elements are highlighted.

Other examples may apply techniques other than machine learning to configure the user interface based on the collected data. Configuring the user interface may involve determining the spatial layout of graphical elements in a user interface, or emphasizing certain graphical elements in the user interface, based on the collected data. In some examples, algorithms or lookup tables may be applied to select graphical elements and organize them in the user interface based on the collected data. For example, a lookup table may correlate certain device settings or characteristics to certain graphical elements or arrangements of graphical elements. As another example, a lookup table may correlate certain types of content (e.g., from webpages previously visited by a user) to certain graphical elements or arrangements of graphical elements. Some examples may apply a combination of machine-learning and other techniques to determine the spatial layout of the graphical elements based on the collected data.

Current methods that exist for allowing users to perform on-line activities often provide a similar user experience for all users. For example, users may access a digital management service provided by the server operator, but the same experience may be provided to all users and devices regardless of their characteristics. And customizing an on-line experience for a particular user or device can be challenging, particularly if the user has not already established an account with the server operator and selected their customizations, because the server operator may have little to no information about the user's preferences. But some examples of the present disclosure can overcome one or more of these problems by allowing for an on-line experience to be automatically customized for a particular user, even if the user has not already established an account with a server operator and selected their customizations. This can be achieved via machine learning and other techniques described herein. For example, a machine-learning model can analyze the browser history of the user device to determine that the user frequently accesses one or more websites. The machine-learning model can then determine the content of the one or more websites, for example by communicating with the websites or by accessing a predefined database that correlates websites to their content. Based on the content of the one or more websites previously visited by the user, the machine-learning model can select or emphasize (e.g., highlight) the certain graphical elements in the user interface. In some examples, the machine-learning model can correlate the browser history of a new user client device to the browser histories collected from previous user client devices. The machine-learning model can organize the spatial layout of graphical elements in the new user interface based on the spatial layout from the previous user interfaces. The machine-learning model can be trained using any suitable training data, such as device information collected from the user devices of other users and/or user interaction information describing user interactions of the other users with one or more interface elements.

Some examples described herein can also facilitate the creation of on-line accounts in a secure and easy manner. In some examples, multiple tier levels for an on-line account or physical card may be available. Because signing up for an account over the Internet is not an in-person process in which a service provider can easily verify the identity of the user, there are unique challenges to establishing an on-line account and maintaining account security that do not exist in the offline context. These unique challenges can include determining and promoting optimal on-line accounts for the user, determining the user qualifications for tier-based on-line accounts or physical cards, and verifying the user qualifications. The user qualifications for an on-line account or physical card can include a user qualification score. The challenges can also include verifying that the user is a human and not a bot. Bots and malicious users account for a substantial number of on-line account signups and consume valuable resources of service providers. For example, bots may spam service providers with signup requests, perform large numbers of automated operations, or otherwise consume significant amounts of computing resources. Preventing bots and other malicious users from signing up can yield a significant reduction in computational overhead may improve the overall functionality of the system.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a flow chart of an embodiment of the disclosed subject matter. FIG. 1 illustrates a process in which a user may open an on-line account via a computer network, e.g., the Internet, by accessing and exchanging information using the website of a server operator. In some examples, the user can represent a customer. The user enters the system by accessing or being directed to a server operator's website (webpage) as shown in Block 101. In either event, a request for the website is received by the server operator's server or proxy server. The user is presented a list of on-line accounts or physical cards associated with the server operator. In some examples, the on-line accounts or physical cards can be considered products. The on-line accounts or physical cards presented to the user may also be a function of path used by the user to arrive at the website. For example, if the user accessed the website via a hyperlink on another site directed to retirement, only the retirement related on-line accounts may be presented, or the entire scope of on-line accounts is presented but the retirement related on-line accounts are highlighted. In this manner, the most relevant on-line accounts based on the user's path may be brought to the user's attention. The on-line accounts or physical cards presented to the user may also depend on data collected from a user device (e.g., the user's browser history) or from the user.

Figure 2:
FIG. 2 is a representative chart listing information that makes up a first set of information according to an embodiment of the disclosed subject matter.

Following FIG. 1, the user may then select an on-line account or physical card from the on-line accounts or physical cards presented as shown in Block 102. The user's choice is received by the server operator. An evaluation of whether the user is a current on-line client of the server operator takes place as shown in Block 103. Users that are already known to the server may advantageously be given the opportunity to streamline the application process. A first set of information is requested of and received from the user in determining if the user is a known user. The first set of information may include (as shown in FIG. 2) a user ID for the user, a password for the user, etc. Upon receiving the first set of information, the information is authenticated with the on-line information kept or known by the server operator and a pre-existing user identification profile is verified. If the user is determined to be a known user as shown in Block 103, then the user is authorized using on-line activity sign-on as shown in Block 104. In some examples, the on-line activity sign-on is an on-line banking (OLB) sign-on.

Figure 3:
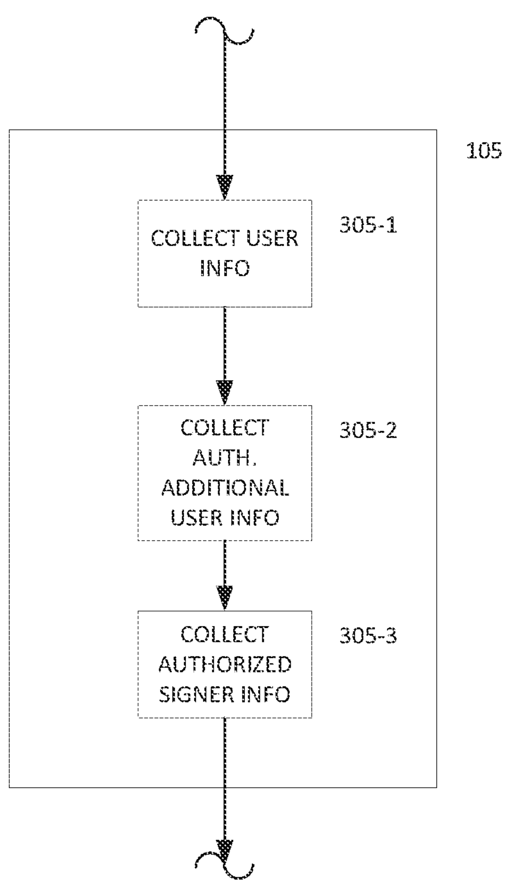
FIG. 3 is a flow chart representing collection of information according to an embodiment of the disclosed subject matter.

If the user is not a known user of the server operator, a second set of information is requested and collected from the user as shown in Block 105. FIG. 3 illustrates a number of steps that may be included in collecting the second set of information. FIG. 3 shows the collection of user information in Block 305-1 and authorized additional user information in Block 305-2 and the collection of an authorized signer information in Block 305-3. In some examples, the user information can be business information. This second set of information may include a wide variety of user identification information including business name, physical address, headquarter, phone number, organization type, establishment date, domestic or foreign, State of incorporation, other DBAs, industry, business classification, and/or number of employees. The user may select the type of identification from a dropdown list that includes common ID types.

Examples of the authorized additional user information include the name of the authorized additional user, his/her physical address, date of birth, SSN, relationship to the user, relationship to or position in an entity, contact information such as phone numbers and email addresses, citizenship, and information regarding the characteristics of the identification (e.g. type, ID Number, State of issuance, issue date and expiration date). The information collected in Block 305-3 may include information on individuals who may act on behalf of the user. The information may include name of signer(s), Title, as well as other information related to the signers.

The second set of information is verified as shown in Block 106. This verification may include presenting back to the user for review the second set of information and receiving a third set of information which includes any corrections to the second set of information the user has made. The website may allow and request the user to annotate, modify or otherwise change incorrect or incomplete information upon its presentation to the user. The third set of information may include, as noted previously, several parts. The user is also provided with a set of terms and conditions which may govern the use of the website, on-line activities, application process, etc, as shown in Block 107. The terms and conditions may also include a user check-off which may be required to continue and ensure the set of terms and conditions have been at least noticed, if not reviewed by the user. An application for an on-line account or physical card may be submitted by and received from the user as shown in Block 108.

Figure 4:
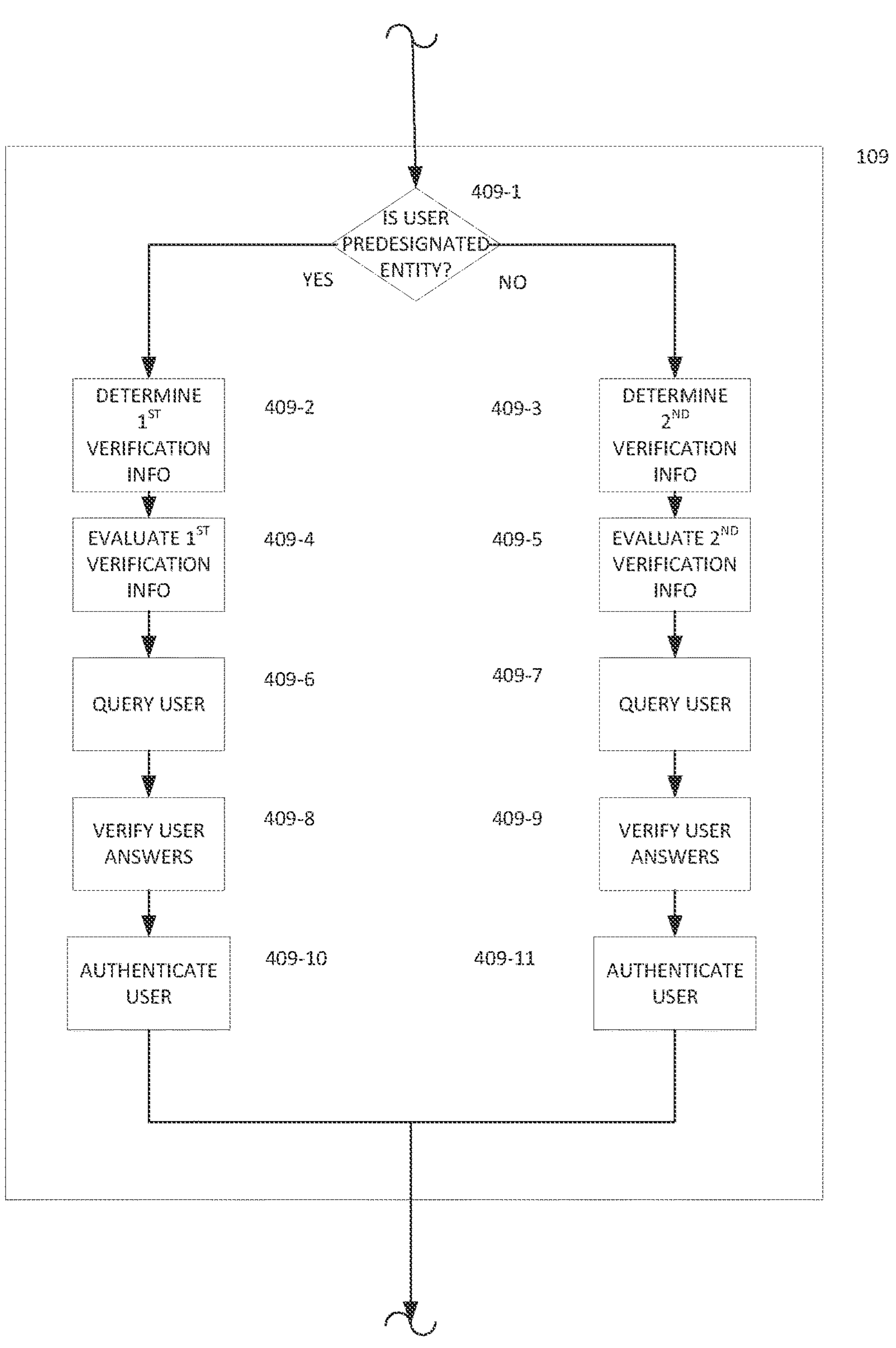
FIG. 4 is a flow chart representing evaluation, verification and authentication of a user according to an embodiment of the disclosed subject matter.

The user identification is then verified in Block 109. FIG. 4 is a flow chart representing evaluation, verification and authentication of a user according to an embodiment of the disclosed subject matter. An embodiment of a process to verify the user identification is shown on FIG. 4. FIG. 4 begins with a determination of whether the user is a particular type of entity, as shown in Block 409-1.

If the user is the particular type of entity, a first part of the third information may be determined as shown in Block 409-2. This may include providing information to a third party or to a database associated with a server operator such as may be owned and/or operated by the server operator. The first part of the third information may be evaluated as shown in Block 409-4, this evaluation may be based on a comparison of known information with the information collected from the user as the first part of the third set of information. This evaluation may utilize a first set of predetermined criteria. The first set of predetermined criteria, as listed in FIG. 10A, may include whether the user is a new or an existing client of the server operator; whether the user has been identified as a bot or malicious entity; whether the user has been identified as a bot or malicious entity by a third party and whether the user identity verification score exceeds a predetermined threshold. In some examples, the server operator is a financial institution and the third party is another financial institution. These and other criteria may be used to assess the legitimacy of the user and may be included in the set of predetermined criteria in verifying the first part of the third set of Information. Upon evaluation, a score or index may be determined reflective of the outcome of the evaluation. For example, if the name, address, phone number and SSN match, a score reflecting a high matching comparison may be given, whereas when one or more of these do not match, a score reflecting a lower matching comparison may be applied. The user may then be queried regarding answers related to his/her identity for verification as shown in Block 409-6. Questions in the query may include for example information typically known only to the individual, such as mother's maiden name, previous address, etc. The answers provided by the user may be verified in Block 409-8. Based on the score or index relating to the first part of the third set of information and the verification of the user's answer to the identity query the user may be authenticated as shown in Block 409-10.

Figure 5A:
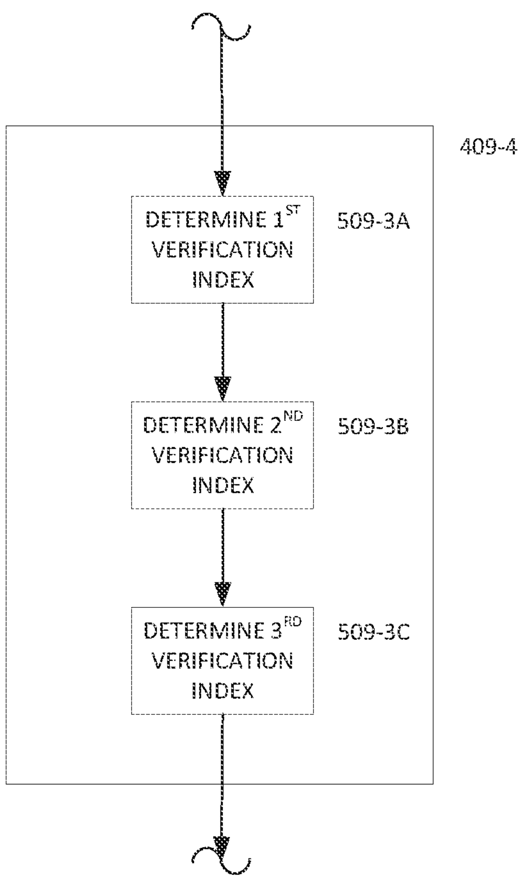
FIG. 5A is a flow chart representing the determination of verification index according to an embodiment of the disclosed subject matter.
Figure 5B:
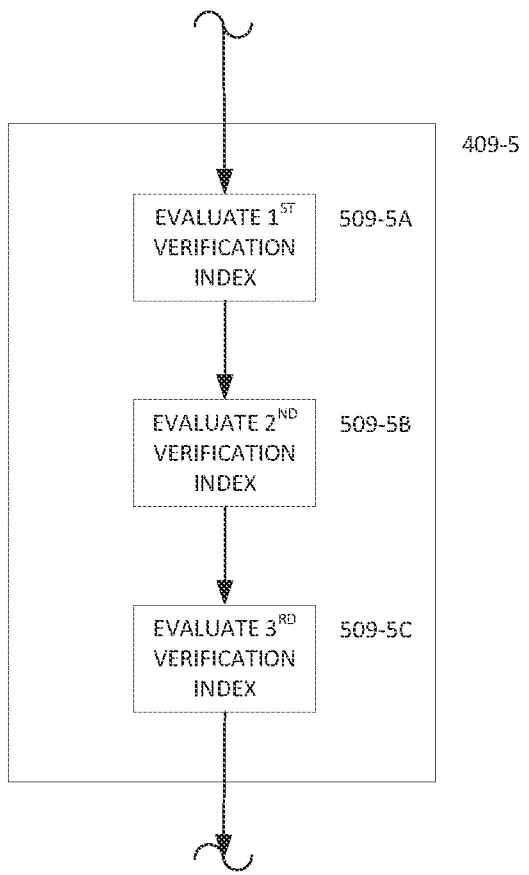
FIG. 5B is a flow chart representing the evaluation of verification index according to an embodiment of the disclosed subject matter.

If the user is determined not to be the particular type of entity in decision Block 409-1, then a second part of the third information may be determined as shown in Block 409-3. The second part of the third information may be evaluated as shown in Block 409-5. This evaluation may utilize a second set of predetermined criteria. The second set of predetermined criteria, as listed in FIG. 10B, may include whether the user is a new or an existing client of the server operator; whether the user has been identified as a bot or malicious entity; whether the user has been identified as a bot or malicious entity by a third party and whether the user identity verification score exceeds a predetermined threshold. These and other criteria used to assess the legitimacy of the user may be included in the second set of predetermined criteria in verifying the second part of the third set of Information. The first part of the third set of information and the second part of the third set of information may have common information and thus need not be mutually exclusive. These criteria allow for the application of internal decisioning rules. FIGS. 5A and 5B show steps that may be used in verifying the second part of the third set of information.

FIG. 5A illustrates tasks associated with evaluating the first part of the third set of information from block 409-4. Turning to FIG. 5A, a first verification index is determined as shown in Block 509-3A. A second verification index is determined as shown in Block 509-3B and a third verification index is determined in Block 509-3C. Each verification index represents evaluations using a particular set or area of information. The sets or areas of information may or may not be mutually exclusive. One verification index may be based on the information which includes searches drawn from public records and public directories. Another verification index may be based on the user information, for example name, address, Social Security Number (SSN) and contact information. Yet another verification index may be based on the relationship between the user and authorized additional user(s). This latter index may be based on the degree to which the authorized additional user can be linked to the user based on public records. These verification indices may be performed internal to the server operator or by a third party. FIG. 5B illustrates tasks associated with evaluating the second part of the third set of information from block 409-5. In FIG. 5B, the first, second and third verification indices are determined in Blocks 509-5A, 509-5B and 509-5C, respectively. Additional verification indices may also be employed.

Figure 6:
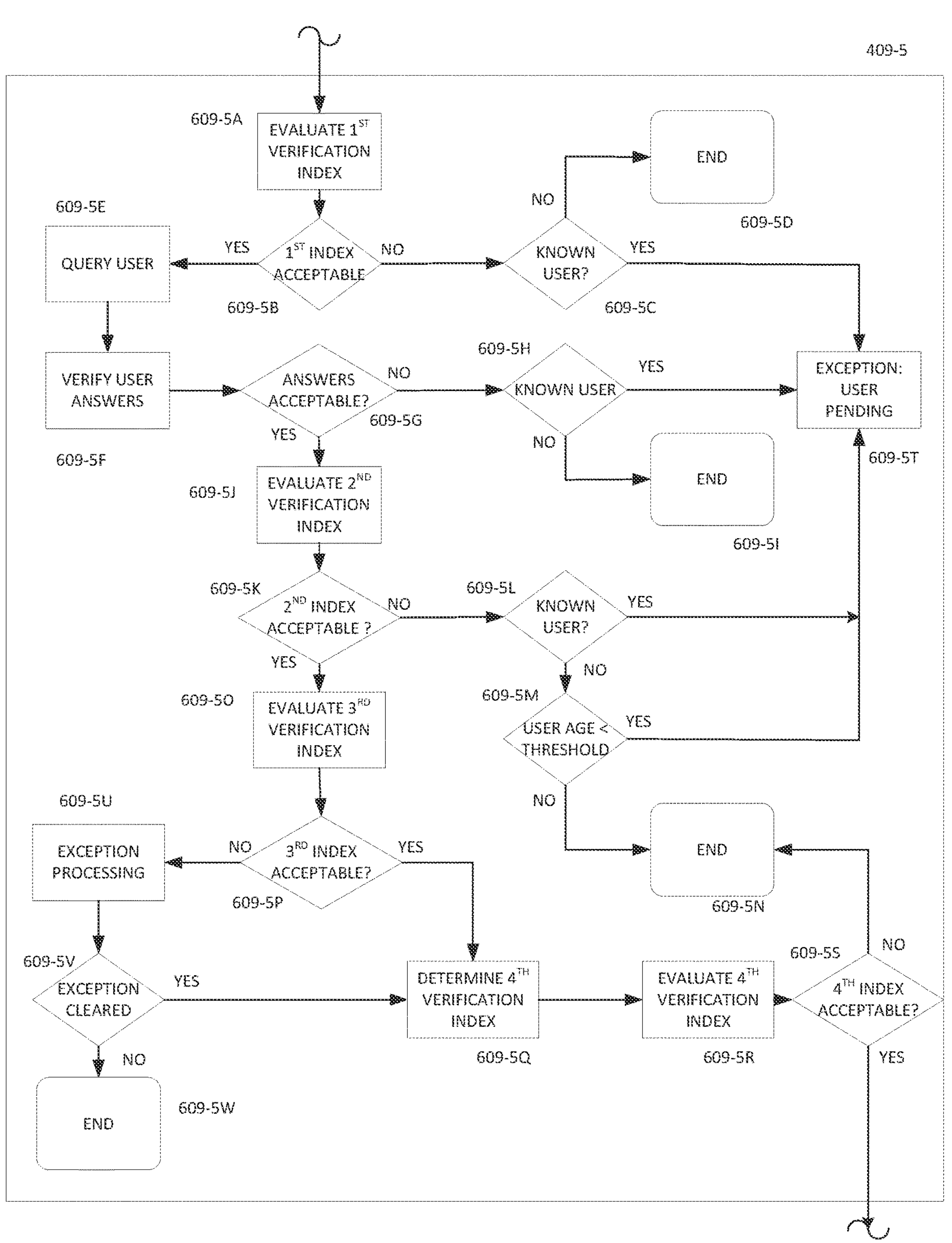
FIG. 6 is a flow chart representing the acceptance of a user including exceptions of the verification indices according to an embodiment of the disclosed subject matter.

FIG. 6 is a flow chart representing the acceptance of a user including exceptions of the verification indices according to an embodiment of the disclosed subject matter. In some examples, the user is an entity such as a business. The entity may be a customer of the server operator. The first verification index is evaluated as shown in Block 609-5A. The first verification index is then compared to a threshold to determining if it is acceptable as shown in Block 609-5B. If the first index is not acceptable then the decision process looks to whether the user is already known to the server operator (e.g., an existing client) as shown in Block 609-SC. If the user is not already known to the server operator then the application process ends as shown the Block 609-SD. If on the other hand, the user is already known to the server operator or some other trigger is met, the user is provided an exception to terminating the process and a decision to proceed becomes pending as shown in Block 609-ST. Users pending may be manually reviewed by the server operator, however information and on-line account or physical card presentation may continue until the review is completed.

If the first verification index is determined to be acceptable in Block 609-5B, the user is further questioned as shown in Block 609-5E and Block 409-7 of FIG. 4, specifically questions to authenticate the identity of the additional authorized user may be asked. The given answers are verified in Block 609-5F, Block 409-9, and a determination as to the acceptability of the answers is made in decision Block 609-5G. If the answers are found to be unacceptable, such as incomplete or false answers regarding the relationship of the user to the server operator, a determination is made as to whether the user is a known user as indicated in decision Block 609-5H, If the user is already known to the server operator, the user is provided an exception and a manual review may be performed as represented by Block 609-5T. The user is "pending" as discussed above and while further processing directed to acceptance of the application may be halted, information may continue to be collected and on-line accounts and physical cards may continue to be presented. It is important to note that the identity of the additional authorized user and the relationship between the user and the additional authorized user should be verified. If the user is not an existing client, the application process ends as shown in Block 609-51.

If the user's answers are found acceptable in Block 609-5G the second verification index is evaluated as shown in Block 609-5J. If the second verification index is found not acceptable in Block 609-5K there is a determination of whether the user is already known to the server operator in decision Block 609-5L. If the user is a known user, the application becomes pending as shown in Block 609-5T. If the user is not a known user, then a determination is made regarding an age of the user. If the age is less than a predetermined threshold as determined in decision Block 609-5M the user is placed in a pending stage as represented by Block 609-5T. The addition of exceptions processing is advantageous, for example, when the user is verified but the additional authorized user has not been satisfactorily verified. The age may be another indication of legitimacy. If the age is not less than the threshold, the application process may end as shown in Block 609-5N. As shown further in FIG. 6, if the second verification index is found acceptable in Block 609-5K, an evaluation of a third evaluation index may be performed in Block 609-50.

If the third verification index is not acceptable as determined in decision Block 609-5P, exception processing may be commenced as indicated in Block 609-5U. If the exception is not cleared in Block 609-5V, the process may end at Block 609-5W. If the exception is cleared in Block 609-5V or if the third verification index is acceptable as determined in Block 609-5P a fourth verification index may be determined as shown in Block 609-5Q, evaluated in Block 609-5R and a determination of its acceptability made in decision Block 609-5S. If the fourth index is not found to be acceptable the process may end as shown in Block 609-5N. If the fourth verification index is acceptable and the user is authenticated as shown back on FIG. 4 in Block 409-11 then the process continues. The authentication is preferably based on the score or index relating to the second part of the third set of information and the verification of the user's answer or answers to the identity query. By completing this rigorous authentication process, the system may be able to distinguish human users from automated bots (e.g., scripts) or other malicious actors. In the embodiment shown in FIG. 6, the first verification index may be a business verification index and the second verification index may be an additional authorized representative verification index and the third may be an authorized representative to business index. The order of which some or all of the indexes are evaluated may be modified.

Returning to FIG. 1, if the user identification is not verified in decision Block 110 the process ends or as discussed in relation to FIG. 6 an exception may be granted as shown in Block 111 of FIG. 1. If the user ID is verified, a score which may preferably be representative of the user's worthiness is determined and verified as shown in Block 112. An example of the score may be a credit score. The score may be determined using a predetermined set of rules such as those listed in FIG. 11A and/or FIG. 11B. The predetermined set of rules may include decisions on one or more of a SSN evaluation, an identity theft evaluation, a retail indicator evaluation, a previous inquires evaluation, a closure summary evaluation, and a closure details evaluation. The decisions may be go/no-go or may be qualitative in nature. For example, if the SSN does not match the name, a no-go decision may be rendered, whereas the previous inquiries evaluation may result in a go/no-go decision or a qualified approval dependent upon another condition. Of course, additional criteria reflective of the user's worthiness may also be applied. This may provide another level of protection against spam, automated bots, and malicious actors. Those types of unwanted entities may not have sufficient history to obtain a worthiness score sufficient to complete the signup process.

Figure 7:
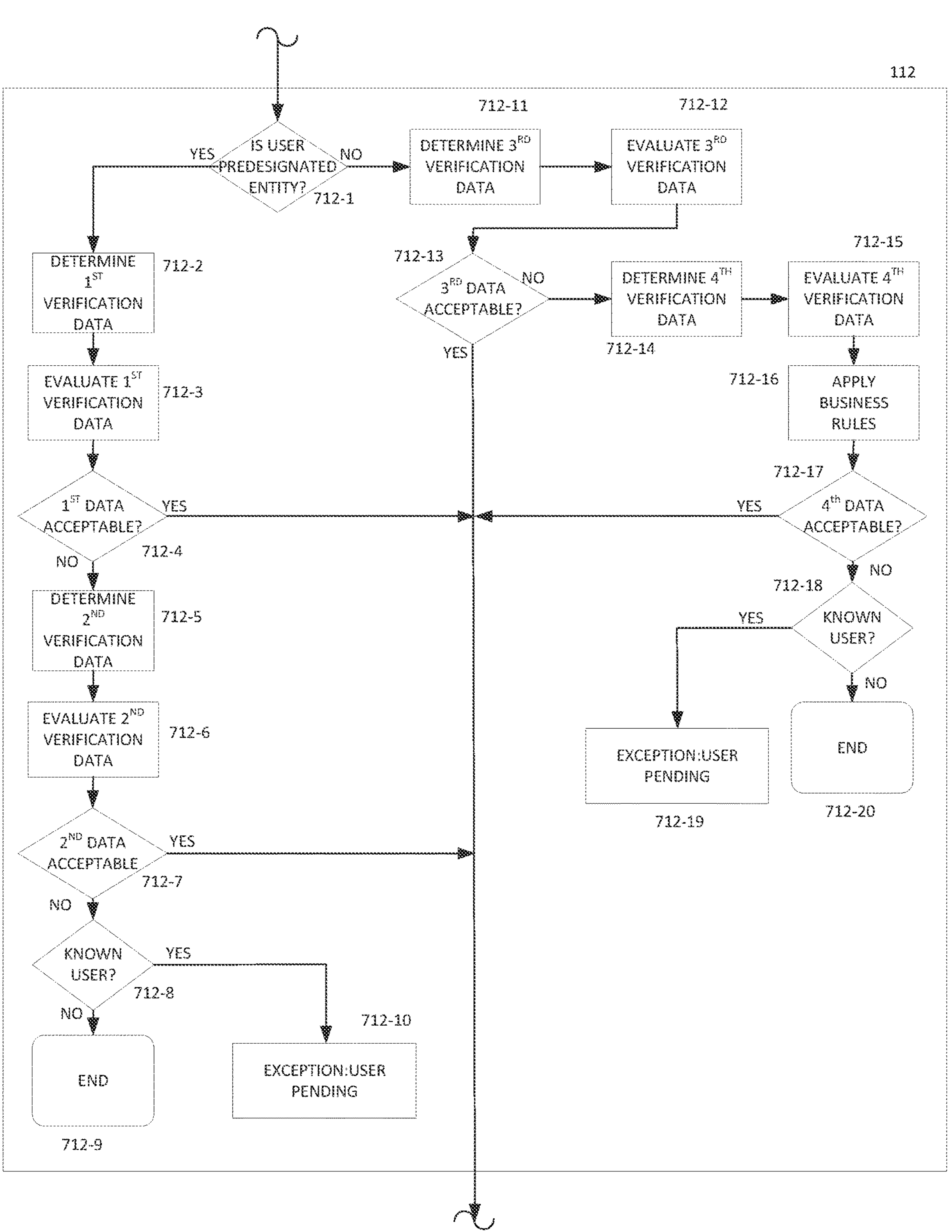
FIG. 7 is a flow chart representing the acceptance of a user including exceptions of the verification indices according to another embodiment of the disclosed subject matter.

FIG. 7 is a flow chart representing the acceptance of a user including exceptions of the verification indices according to another embodiment of the disclosed subject matter. The process may be dependent upon the nature of the user and thus again it is determined in decision Block 712-1 whether the user is a predesignated type of entity or not. If it is determined that the user is the particular type of entity in Block 712-1, a first set of verification data is determined and evaluated in Blocks 712-2 and 712-3, respectively. The first set of verification data may include user information derived from a third party or held internally by the server operator. If the first verification data is acceptable as shown in decision block 712-4, the application procedure continues. If the first set of data is not acceptable a second set of verification data is determined and evaluated as shown in Blocks 712-5 and 712-6, respectively. The second verification data may also include user information and the evaluation may be performed using a third party or internally. One such example of another third party determining and evaluating the second set of verification data is ChexSystems™. If the second set of verification data is found acceptable in decision Block 712-7, then the application proceeds from Block 113 in FIG. 1. However, if the second set of verification data is not acceptable, a determination is made whether the user is an existing client of the server operator, as shown in decision Block 712-8. If the user is an existing client, the user application becomes pending and may be granted an exception after a manual review, as represented by Block 712-9. Otherwise, the application process is terminated as shown in Block 712-9.

If the user is found not to be the particular type of entity, a parallel process is taken. For example, the user's third set of verification data is determined and evaluated in Blocks 712-11 and 712-12 respectively. The third set of verification data may include additional authorized user information and evaluated with information held by a third party or internally by the server operation. If the third set of verification data is found acceptable in decision Block 712-13, the application process continues. If the third set of verification data is not acceptable a fourth set of verification data is determined and evaluated as shown in Block 712-14 and 712-15 respectively. The fourth set of verification data may also include additional authorized user information and its evaluation may include comparison with information held by a third party or internally by the server operator. The fourth set of verification data is also applied to a set of rules established by the server operator as shown in Block 712-16. The set of rules may include decisions based on any of the rules discussed above with respect to FIGS. 11A-B.

If the fourth set of verification data along with the application of rules is acceptable as shown in decision block 712-17, the application process continues. The decision may be a go/no-go or may be qualitative in nature. However, if the data and application of the rules are not acceptable, a determination regarding the user's status as an existing client is made, as shown in Block 712-18. If the user is an existing client, an exception may be made and the user may become pending subject to a manual review as shown in Block 712-19. If at this point in the application process the user is not a client, the application process may be halted as shown in Block 712-20.

Table 1 illustrates an exemplary application of the rules. The Hot File is whether the user has a hit on a predefined blacklist (which may be referred to as a "hot file") the Outcome is whether the application process continues.

TABLE 1

An exemplary application of the rules.

| Hot File | User (new or existing) | Shared Fraud Database | Identity Verification (score exceeds threshold) | Outcome |
|---|---|---|---|---|
| Yes | Any | Any | Any | Fail |
| No | New | Yes | Any | Fail |
| No | New | No | Yes | Fail |
| No | New | No | No | Pass |
| No | Existing | Any | Any | Pass |

Referring back to FIG. 1, a decision on the user's worthiness score is made as shown in Block 113. If the user's worthiness score is not approved, an exception may be made or the application process may be terminated as shown in Block 114. One process of ending the application or granting an exception is discussed above with respect to FIG. 7. If the user's worthiness score is accepted, account options are presented as shown in Block 115.

Figure 11B:
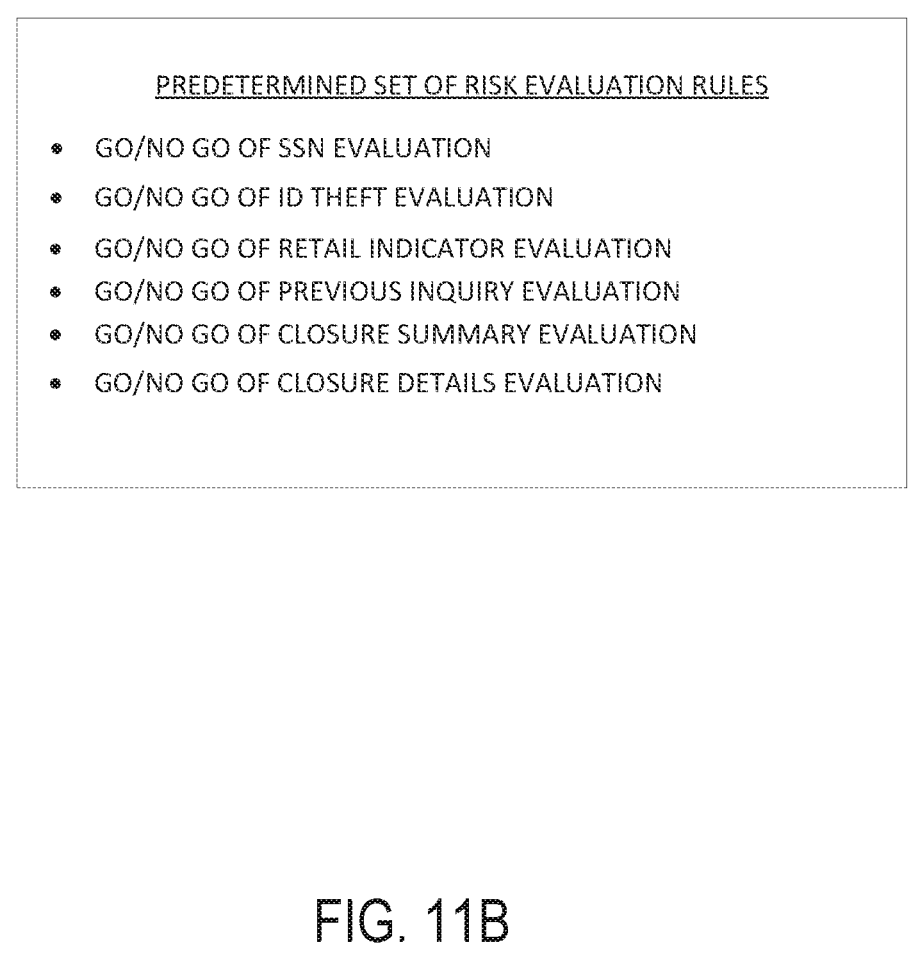

The on-line account options presented may be based at least in part on the verification of the third set of information and the information regarding the user's qualifications. The on-line account options presented may also be a function of the set of risk evaluation rules as shown in FIG. 11B. Multiple account tiers may be available and placement into account tiers may be based on the user's qualifications. These rules may include any of the rules discussed above with respect to FIGS. 11A-B.

Figure 8:
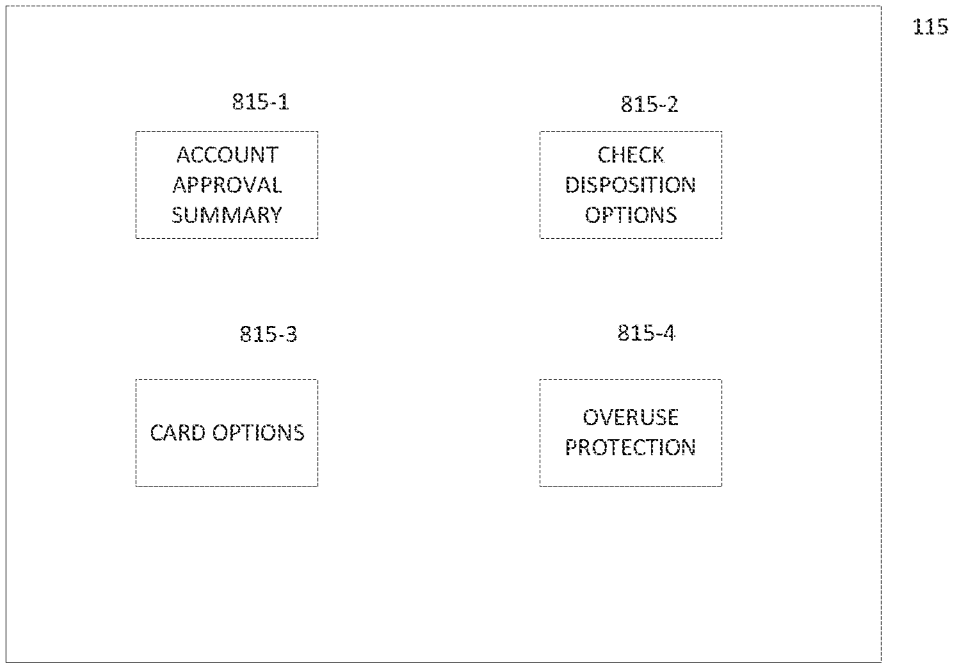
FIG. 8 is a representative chart of services offered according to an embodiment of the disclosed subject matter.

FIG. 8 is a representative chart of services offered according to an embodiment of the disclosed subject matter. The options may include an on-line account approval summary as shown in Block 815-1, check disposition options, Block 815-2, Card options, Block 815-3 and overuse protection, Block 815-4. The account approval summary Block 815-1 may include information based on the outcome of the identity and risk verification as performed in the application process as well as affirmative indicia reflective of the approval status, such as approved or pending. The account approval summary may also indicate which additional information is required. The check disposition options, Block 815-2, may check status and include image statements of checks as well as other features representative of the disposition. The card options, Block 815-3, may include an invitation to apply for a card (e.g., a physical card such as a bankcard) and other related terms or features available. The overuse protection options, Block 815-4, may include several protections against overusage of the account based on various factors and the evaluation of the various information related to the user. The overuse protection options also presents options relating the linking of accounts and creation of new accounts for linking if none presently. In some examples, the account options may be based on collected data from a user device. Upon the selection of the account options, account support options may then be presented to the user as shown in Block 116. The account support options presented may advantageously be based on the options selected by the user.

The account support options are the methods in which the account is to be created, protected, updated, modified, or further verified. These account support options may include receiving further information for implementing two-factor-verification log-in techniques, such as a passcode, a back-up email address, a mobile number for sending variable passcodes, etc. The account support options may also provide options for updating or modifying the account, for example to add currency or content to the account. In addition, other information may be requested from the user for compliance purposes. The further information may then be verified as shown in Block 117 by presenting back to the user all accounts, account support options, and the further information associated with the account support options. The user may modify any of the account support options information before finalizing and submitting the account support options. The user may then be qualified for a physical card.

In decision Block 118, it is determined whether the user is to be enrolled for a card. The decision to be enrolled in a card may be determined as a function of the information previously supplied by the user. If the user is to be enrolled for a card, information regarding the enrollment is collected and a level of enrollment is determined as shown in block 119. The level of enrollment may be based on at least one or more predetermined factors based upon various factors, for example a low user qualifications score would lead to a lower level while a high user qualifications score may advocate for a higher level of enrollment. In addition the status of other user on-line accounts may also be used to determine the level of enrollment for the check card. It is next determined if the user is to be enrolled in special type of on-line account as shown in Block 120. Such a special account may have a special on-line program that includes collecting enrollment information and determining a statement suppression option. A decision to enroll the user in a particular type of on-line service may be determined as shown in Block 121. Information required for enrollment in the service is collected as shown in Block 122.

Figure 9:
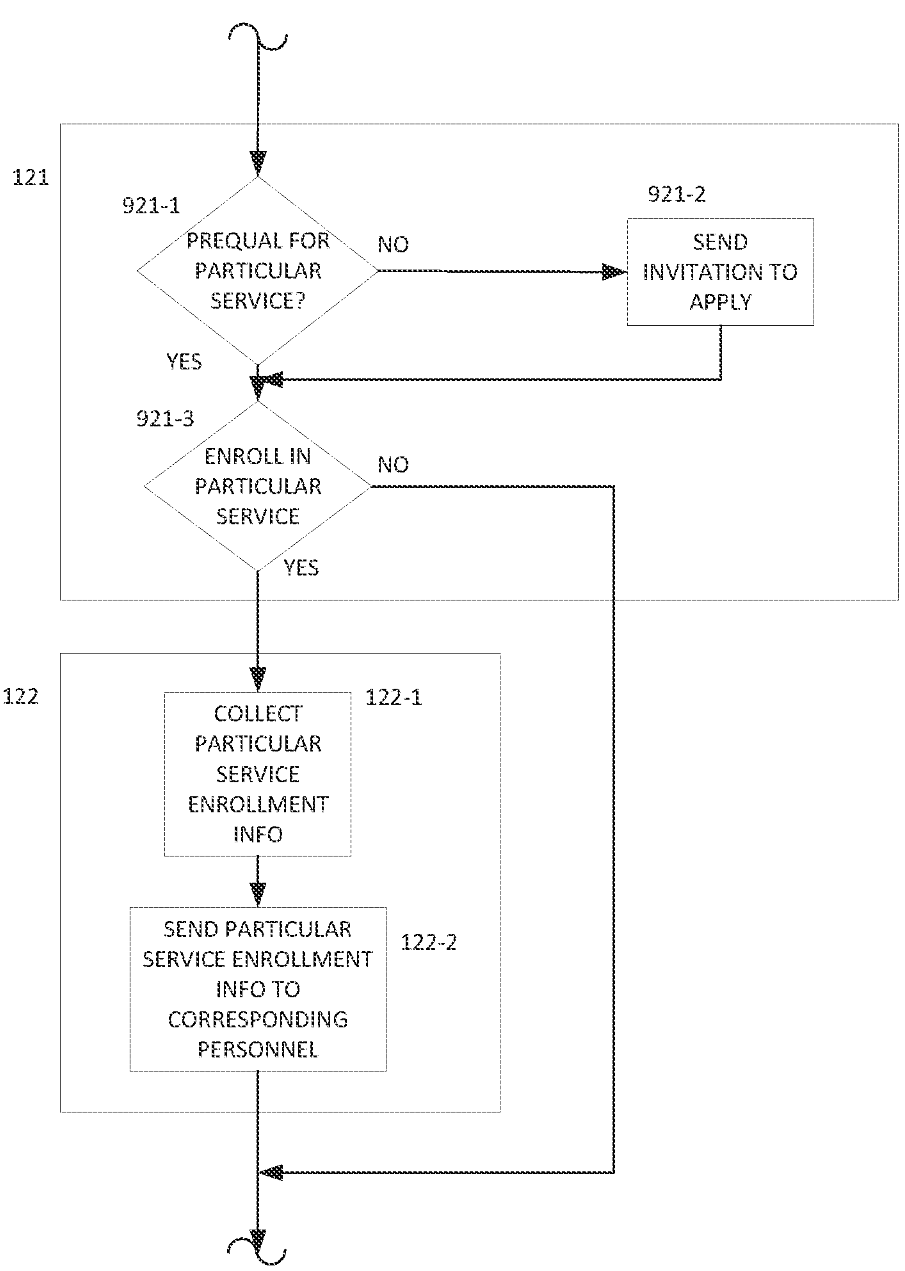
FIG. 9 is a flow chart representing the qualifying of a user for an on-line service according to an embodiment of the disclosed subject matter.

FIG. 9 is a flow chart representing the qualifying of a user for an on-line service according to an embodiment of the disclosed subject matter. Based on known information and one or more predetermined factors, it may be determined if the user may be prequalified for a particular service as shown in decision block 921-1. If the user is situated to be prequalified an invitation to apply is sent to the user as shown in Block 921-2. If the user is prequalified, they are presented with the option to enroll in decision Block 921-3. If the user chooses to enroll, information necessary for enrollment is collected in Block 122-1 and user information is sent to the corresponding personnel as shown in Block 122-2 as a lead. Thereafter the service provider may contact the user to further the enrollment into the service. This same process may be used to provide other third party vendors with the opportunity to provide the user with services, for example services related to information collected from the user device.

The user is presented with a final presentation including user information related to the user's on-line accounts and or enrollments reflective of the status of their on-line account opening as shown in Block 123. The final presentation may present a summary of the on-line accounts and physical cards selected by the user. The name on the physical card, authorization level and tier may also be displayed for all physical cards received. User ID may be displayed also with information associated with its use. Selected physical cards and other options (e.g., provided by third parties) that were accepted may be displayed. The nearest physical location associated with the server operator and other information that the user may find useful may be displayed as well. Contact information including phone number, addresses, email addresses and web pages may be presented to the user during final presentation.

Additional on-line accounts and physical cards may be communicated to the user in the final summary, these on-line accounts and physical cards may be only tangentially related or provided by third parties. These additional communications may also be presented based on the information collected from the client device during the on-line process and may be selected by the server operator. Selection by the server operator prevents the unwanted disclosure of private information but still allows the communication to be targeted based on data collected from the client device. The user may also be given the opportunity to select accessories related to the opening of the account. For these additional on-line accounts and physical cards, the user may be connected to another site. Upon completing enrollment, the on-line account opening may be complete as shown in Block 124. Telephone support may thus begin as shown in Block 126, and the opening process ends as shown in Block 125. Telephone assistance may also be available while in the process of on-line account enrollment, to further aid the process. In some examples, telephone support may not be necessary.

Figure 12:
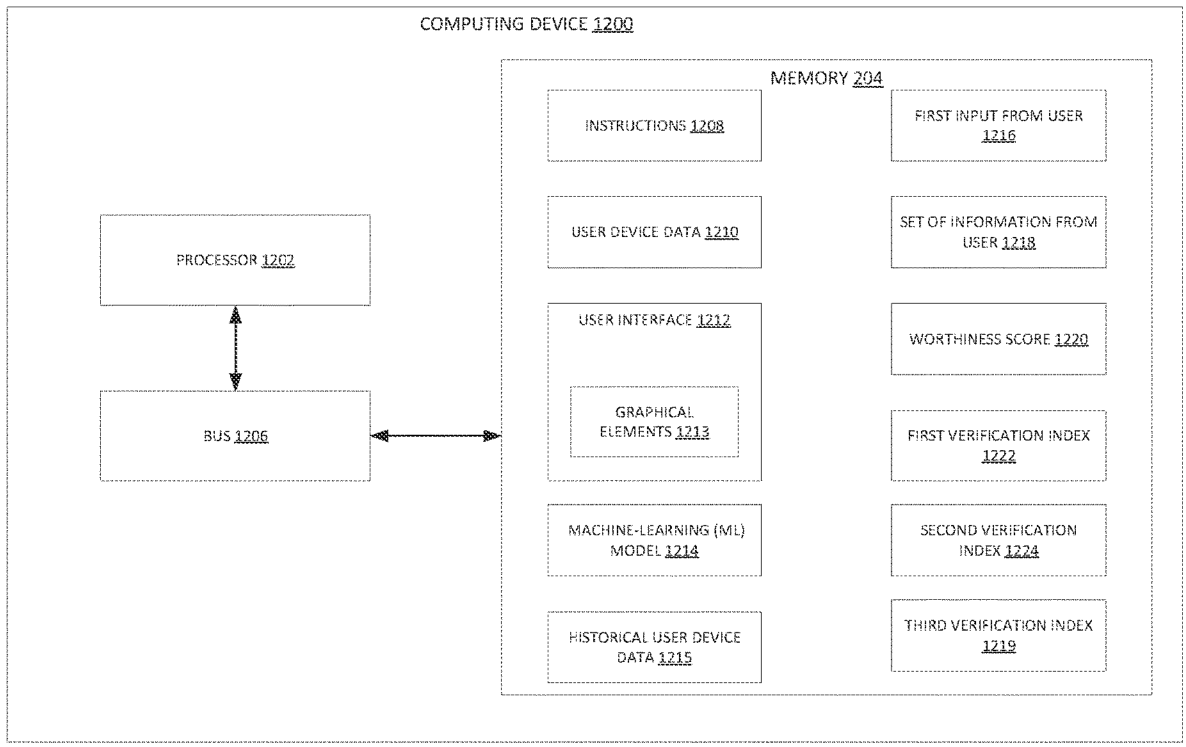
FIG. 12 is a block diagram of a computing device for implementing some aspects of the disclosed subject matter.

FIG. 12 is a block diagram of a computing device 1200 for implementing some aspects of the disclosed subject matter. The components in FIG. 12, such as a processor 1202, a memory 1204, bus 1206, and the like, may be integrated into a single structure such as within a single housing of the computing device 1200. Alternatively, the components shown in FIG. 12 can be distributed with respect to one another and in electrical communication with each other.

The computing device 1200 includes the processor 1202 communicatively coupled to the memory 1204 by the bus 1206. The processor 1202 can include one processor or multiple processors. Non-limiting examples of the processor 1202 include a Field-Programmable Gate Array (FPGA), an application-specific integrated circuit (ASIC), a microprocessor, or any combination of these. The processor 1202 can execute instructions 1208 stored in the memory 1204 to perform operations. In some examples, the instructions 1208 can include processor-specific instructions generated by a compiler or an interpreter from code written in any suitable computer-programming language, such as C, C++, C#, or Java.

The memory 1204 can include one memory device or multiple memory devices. The memory 1204 can be non-volatile and may include any type of memory device that retains stored information when powered off. Non-limiting examples of the memory 1204 include electrically erasable and programmable read-only memory (EEPROM), flash memory, or any other type of non-volatile memory. At least some of the memory 1204 can include a non-transitory computer-readable medium from which the processor 1202 can read the instructions 1208. A computer-readable medium can include electronic, optical, magnetic, or other storage devices capable of providing the processor 1202 with the instructions 1208 or other program code. Non-limiting examples of a computer-readable medium include magnetic disk(s), memory chip(s), random access memory (RAM), an ASIC, a configured processor, or any other medium from which a computer processor can read the instructions.

In some examples, the memory 1204 can further include user device data 1210 that can be collected from a user device. The processor 1202 may configure a user interface 1212 based at least in part on the user device data 1210. Additionally, the processor may emphasize, based on content of the user device data 1210, one or more graphical elements 1213 of the user interface 1212. The memory may also store at least one machine-learning (ML) model 1214. The processor 1202 can train the at least one ML model 1214 using historical user device data 1215. The trained ML model 1214 can be applied to configure the user interface 1212 based at least in part on characteristics of a user or the user device. The processor 1202 can receive a first input from the user 1216 and a set of information from the user 1218. The processor 1202 can determine a worthiness score 1220 based at least in part on the first input from the user 1216. The processor 1202 can determine whether the worthiness score 1220 exceeds a predetermined threshold. In response to determining that the worthiness score 1220 exceeds the predetermined threshold, the processor 1202 can open an on-line account for the user or produce a physical card. The processor 1202 can determine a first verification index 1222, a second verification index 1224, and a third verification index 1219 from the set of information 1218. The processor 1202 can determine whether the first verification index 1224, the second verification index 1224, or the third verification index 1219 is acceptable. In response to determining that all three verification indices are acceptable, the processor 1202 can authenticate a user.

Embodiments of the disclosed subject matter may utilize drop down menus to show the options available to the user and simplify their selection. The website format may also be selectable for use in mobile equipment such as smart phones, Blackberries and PDA equipment, where screen space and functionality may be more limited than on a personal computer. Communications between the user and the server operator during the opening of an account may advantageously be encrypted.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal thereof.

What is claimed is:

1. A system for adjusting a spatial arrangement of a set of graphical elements in a user interface of a webpage in real time, the system comprising:

a processor; and a memory that includes instructions executable by the processor for causing the processor to:

receive a first request for a webpage from a user device of a user, wherein the first request is received at a first point in time;

in response to receiving the first request for the webpage at the first point in time:

dynamically adjust the spatial arrangement of the set of graphical elements in the user interface of the webpage into a first spatial arrangement based on content of at least one webpage previously visited by the user, to thereby generate a first dynamically-tailored user interface; and provide the webpage with the first dynamically-tailored user interface to the user device for display to the user;

after providing the webpage with the first dynamically-tailored user interface to the user device, receive a second request for the webpage from the user device of the user, wherein the second request is received at a second point in time that is after the first point in time; and in response to receiving the second request:

dynamically adjust the spatial arrangement of the set of graphical elements in the user interface of the webpage into a second spatial arrangement based on browser history data associated with the user, to thereby generate a second dynamically-tailored user interface that is different from the first dynamically-tailored user interface, wherein the second dynamically-tailored user interface includes at least one graphical element that is in a new spatial location in the second dynamically-tailored user interface relative to its previous location in the first dynamically-tailored user interface; and provide the webpage with the second dynamically-tailored user interface to the user device for display to the user.

2. The system of claim 1, wherein the memory further comprises instructions that are executable by the processor for causing the processor to emphasize, based on the content of the at least one webpage, at least one graphical element of the user interface.

3. The system of claim 1, wherein the memory further comprises instructions that are executable by the processor for causing the processor to:

receive data describing characteristics of the user device, wherein the data includes a device type, a browser type, or a screen size associated with the user device; and generate the first spatial arrangement or the second spatial arrangement for the user interface of the webpage based on the data.

4. The system of claim 1, wherein the memory further comprises instructions executable by the processor for causing the processor to:

train a machine-learning model based on historical data collected from user devices, the historical data including device information about the user devices and user interaction information associated with users of the user devices; and execute the trained machine-learning model to generate the first spatial arrangement or the second spatial arrangement for the user interface of the webpage based at least in part on characteristics of the user device or the user.

5. The system of claim 1, wherein the memory further comprises instructions that are executable by the processor for causing the processor to:

receive a first input from the user, wherein the first input includes a selection of a graphical element among a plurality of graphical elements of the user interface, the graphical element corresponding to an on-line account or a physical card;

determine a worthiness score for the user, wherein the worthiness score is representative of the user's qualifications to receive access to the on-line account or the physical card; and in response to determining that the worthiness score exceeds a predetermined threshold, open the on-line account for the user or provide the physical card with to the user.

6. The system of claim 5, wherein the memory further comprises instructions executable by the processor for causing the processor to:

receive a set of information from the user, wherein the set of information is associated with an additional authorized user or an authorized signer associated with the user;

determine at least one verification index from the set of information;

compare the at least one verification index to a threshold to determine whether the at least one verification index is acceptable; and in response to determining that the at least one verification index is acceptable, authenticate the user.

7. The system of claim 1, wherein the memory further comprises instructions that are executable by the processor for causing the processor to:

determine a first verification index for the user;

determine whether the first verification index is acceptable based on a first threshold;

in response to determining that the first verification index is acceptable, determine a second verification index for the user;

determine whether the second verification index is acceptable based on a second threshold;

in response to determining that the second verification index is acceptable, determine a third verification index for the user;

determine whether the third verification index is acceptable based on a third threshold; and in response to determining that the third verification index is acceptable, authenticate the user.

8. A method for adjusting a spatial arrangement of a set of graphical elements in a user interface of a webpage in real time, the method comprising:

receiving, by one or more processors, a first request for a webpage from a user device of a user, wherein the first request is received at a first point in time;

in response to receiving the first request for the webpage at the first point in time:

dynamically adjusting, by the one or more processors, the spatial arrangement of the set of graphical elements in the user interface of the webpage into a first spatial arrangement based on content of at least one webpage previously visited by the user, to thereby generate a first dynamically-tailored user interface;

providing, by the one or more processors, the webpage with the first dynamically-tailored user interface to the user device for display to the user; and after providing the webpage with the first dynamically-tailored user interface to the user device, receiving, by the one or more processors, a second request for the webpage from the user device of the user, wherein the second request is received at a second point in time that is after the first point in time; and in response to receiving the second request:

dynamically adjusting, by the one or more processors, the spatial arrangement of the set of graphical elements in the user interface of the webpage into a second spatial arrangement based on browser history data associated with the user, to thereby generate a second dynamically-tailored user interface that is different from the first dynamically-tailored user interface, wherein the second dynamically-tailored user interface includes at least one graphical element that is in a new spatial location in the second dynamically-tailored user interface relative to its previous location in the first dynamically-tailored user interface; and providing, by the one or more processors, the webpage with the second dynamically-tailored user interface to the user device for display to the user.

9. The method of claim 8, further comprising emphasizing, based on the content of the at least one webpage, at least one graphical element of the user interface.

10. The method of claim 8, further comprising:

receiving data describing characteristics of the user device, wherein the data includes a device type, a browser type, or a screen size associated with the user device; and generating the first spatial arrangement or the second spatial arrangement for the user interface of the webpage based on the data.

11. The method of claim 8, further comprising:

training a machine-learning model based on historical data collected from user devices, the historical data including device information about the user devices and user interaction information associated with users of the user devices; and executing the trained machine-learning model to generate the first spatial arrangement or the second spatial arrangement for the user interface of the webpage based at least in part on characteristics of the user device or the user.

12. The method of claim 8, further comprising:

receiving a first input from the user, wherein the first input includes a selection of a graphical element among a plurality of graphical elements of the user interface, the graphical element corresponding to an on-line account or a physical card;

determining a worthiness score for the user, wherein the worthiness score is representative of the user's qualifications to receive access to the on-line account or the physical card; and in response to determining that the worthiness score exceeds a predetermined threshold, opening the on-line account for the user or provide the physical card with to the user.

13. The method of claim 12, further comprising:

receiving a set of information from the user, wherein the set of information is associated with an additional authorized user or an authorized signer associated with the user;

determining at least one verification index from the set of information;

comparing the at least one verification index to a threshold to determine whether the at least one verification index is acceptable; and in response to determining that the at least one verification index is acceptable, authenticating the user.

14. The method of claim 8, further comprising:

determining a first verification index for the user;

determining whether the first verification index is acceptable based on a first threshold;

in response to determining that the first verification index is acceptable, determining a second verification index for the user;

determining whether the second verification index is acceptable based on a second threshold;

in response to determining that the second verification index is acceptable, determining a third verification index for the user;

determining whether the third verification index is acceptable based on a third threshold; and in response to determining that the third verification index is acceptable, authenticating the user.

15. A non-transitory computer-readable medium comprising instructions that are executable by a processor for causing the processor to:

receive a first request for a webpage from a user device of a user, wherein the first request is received at a first point in time;

in response to receiving the first request for the webpage at the first point in time:

dynamically adjust a spatial arrangement of a set of graphical elements in a user interface of the webpage into a first spatial arrangement based on content of at least one webpage previously visited by the user, to thereby generate a first dynamically-tailored user interface; and provide the webpage with the first dynamically-tailored user interface to the user device for display to the user;

after providing the webpage with the first dynamically-tailored user interface to the user device, receive a second request for the webpage from the user device of the user, wherein the second request is received at a second point in time that is after the first point in time; and in response to receiving the second request:

dynamically adjust the spatial arrangement of the set of graphical elements in the user interface of the webpage into a second spatial arrangement based on browser history data associated with the user, to thereby generate a second dynamically-tailored user interface that is different from the first dynamically-tailored user interface, wherein the second dynamically-tailored user interface includes at least one graphical element that is in a new spatial location in the second dynamically-tailored user interface relative to its previous location in the first dynamically-tailored user interface; and provide the webpage with the second dynamically-tailored user interface to the user device for display to the user.

16. The non-transitory computer-readable medium of claim 15, further comprising instructions that are executable by the processor for causing the processor to emphasize, based on the content of the at least one webpage, at least one graphical element of the user interface.

17. The non-transitory computer-readable medium of claim 15, further comprising instructions that are executable by the processor for causing the processor to:

receive data describing characteristics of the user device, wherein the data includes a device type, a browser type, or a screen size associated with the user device; and determine the first spatial arrangement or the second spatial arrangement for the user interface of the webpage based on the data.

18. The non-transitory computer-readable medium of claim 15, further comprising instructions executable by the processor for causing the processor to:

train a machine-learning model based on historical data collected from user devices, the historical data including device information about the user devices and user interaction information associated with users of the user devices; and execute the trained machine-learning model to generate the first spatial arrangement or the second spatial arrangement for the user interface of the webpage based at least in part on characteristics of the user device or the user.

19. The non-transitory computer-readable medium of claim 15, further comprising instructions that are executable by the processor for causing the processor to:

receive a first input from the user, wherein the first input includes a selection of a graphical element among a plurality of graphical elements of the user interface, the graphical element corresponding to an on-line account or a physical card;

determine a worthiness score for the user, wherein the worthiness score is representative of the user's qualifications to receive access to the on-line account or the physical card; and in response to determining that the worthiness score exceeds a predetermined threshold, open the on-line account for the user or provide the physical card with to the user.

20. The non-transitory computer-readable medium of claim 19, further comprising instructions executable by the processor for causing the processor to:

receive a set of information from the user, wherein the set of information is associated with an additional authorized user or an authorized signer associated with the user;

determine at least one verification index from the set of information;

compare the at least one verification index to a threshold to determine whether the at least one verification index is acceptable; and in response to determining that the at least one verification index is acceptable, authenticate the user.

* * * * *